Dec. 7, 1937.    W. TAYLOR    2,101,298
CALCULATOR
Filed April 25, 1933    6 Sheets-Sheet 1
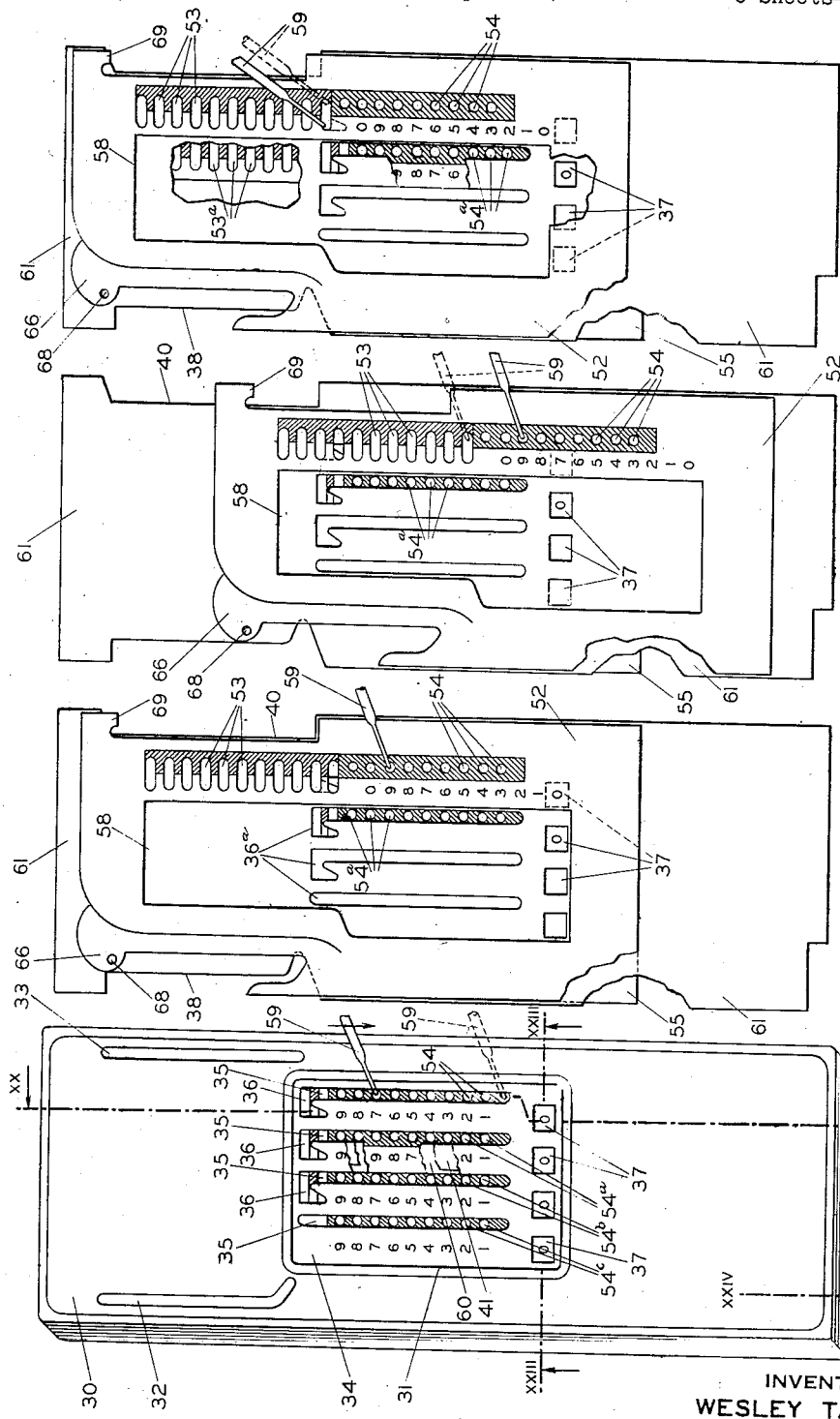
INVENTOR
WESLEY TAYLOR
BY HIS ATTORNEY Dec. 7, 1937.    W. TAYLOR    2,101,298
CALCULATOR
Filed April 25, 1933    6 Sheets-Sheet 2
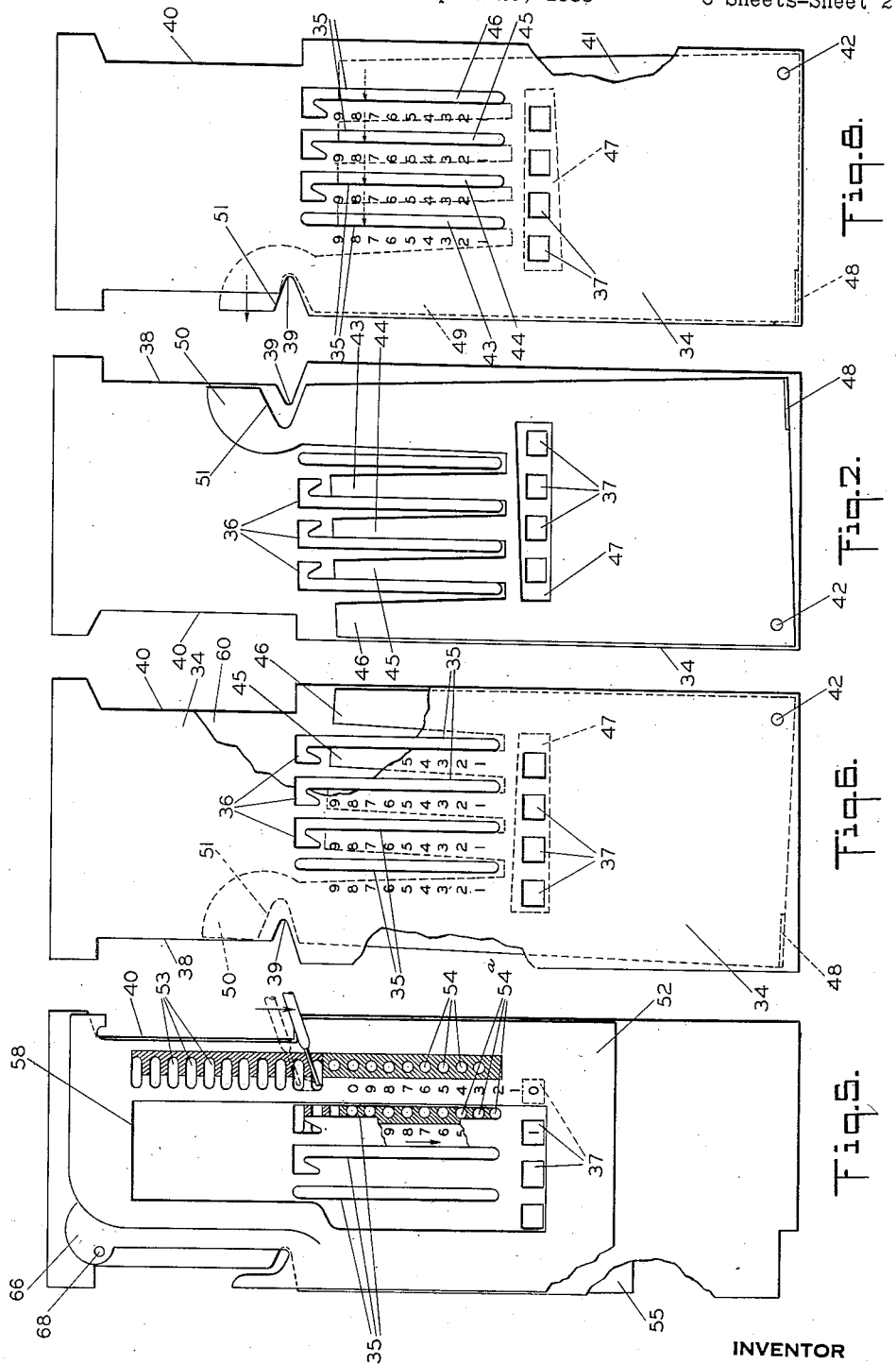
INVENTOR
WESLEY TAYLOR
BY HIS ATTORNEY Dec. 7, 1937.  W. TAYLOR  2,101,298
CALCULATOR
Filed April 25, 1933  6 Sheets-Sheet 3

INVENTOR
WESLEY TAYLOR
BY HIS ATTORNEY

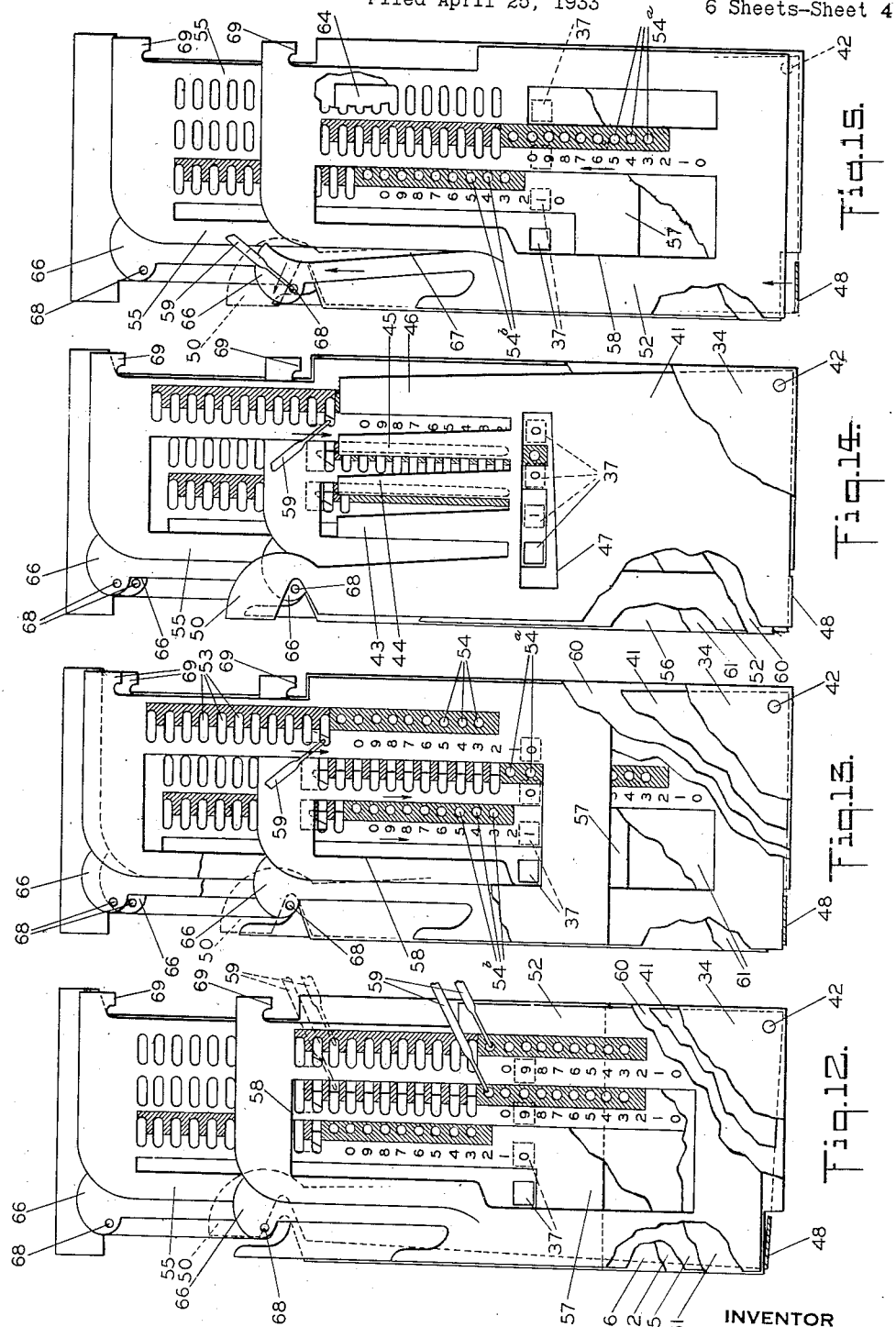

Dec. 7, 1937.                W. TAYLOR                2,101,298
                             CALCULATOR
                       Filed April 25, 1933           6 Sheets-Sheet 5

INVENTOR
WESLEY TAYLOR
BY HIS ATTORNEY

Dec. 7, 1937.  W. TAYLOR  2,101,298
CALCULATOR
Filed April 25, 1933  6 Sheets—Sheet 6
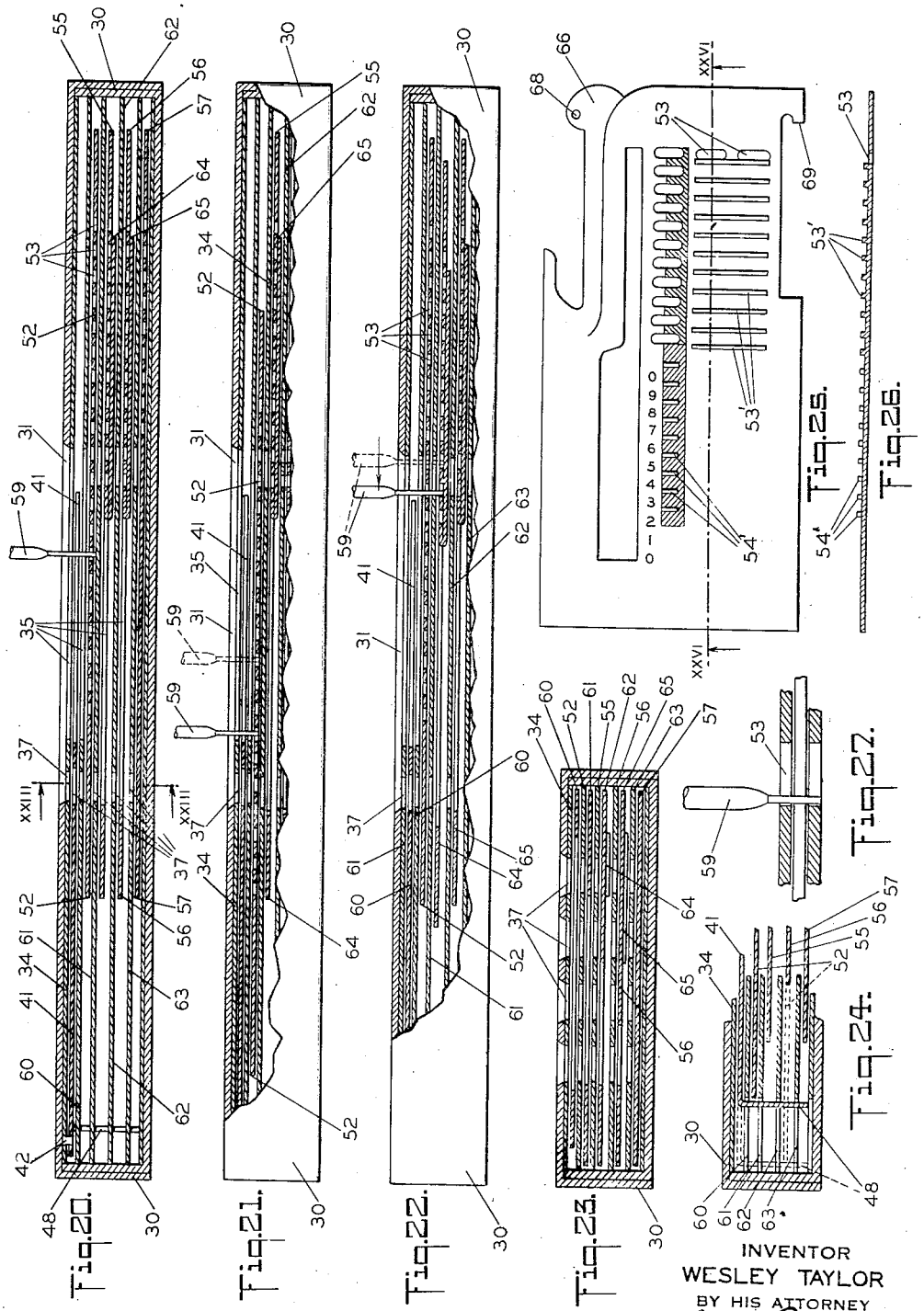
INVENTOR
WESLEY TAYLOR
BY HIS ATTORNEY

Patented Dec. 7, 1937

2,101,298

UNITED STATES PATENT OFFICE 2,101,298

CALCULATOR

Wesley Taylor, New York, N. Y., assignor of thirty-eight one-hundredths to Donald S. Root, Bronxville, N. Y., nineteen one-hundredths to Guy Atkinson, New York, N. Y., and five one-hundredths to Warren C. Du Bois, New York, N. Y.

Application April 25, 1933, Serial No. 667,779

15 Claims. (Cl. 235—69)

My invention relates to a machine whereby mathematical calculations may be made by moving certain parts of the machine with respect to certain other parts. It also relates to a method of making calculations whereby certain relative movements are made to the end that a correct result may be indicated. More particularly the invention relates to an apparatus wherein the parts which are moved lie one behind the other in substantially parallel planes, and a method of sliding these parts with relation to each other.

One object of the invention is to provide a simpler, more compact, and less expensive commercial calculating machine than has heretofore been available. Another object is to provide such a machine which may be easily operated and which will give a positive reading showing an accurate result. A further object is to provide a calculating machine which will remain in adjustment and which will require a minimum of repairs. Other objects will be apparent upon consideration of this specification.

The invention is illustrated, by way of example, in the accompanying drawings, wherein—

Figure 1 is a front view of a calculating machine constructed in accordance with the invention;

Fig. 2 is a similar view, certain parts being removed, and certain other parts being broken away for clearness;

Fig. 3 is a view similar to Fig. 2, the parts being relatively displaced as in making a calculation;

Fig. 4 is a view similar to Figs. 2 and 3, the parts being relatively displaced as in the act of making a different calculation;

Fig. 5 is a view similar to Figs. 2, 3, and 4, the parts being displaced as at the completion of the calculation illustrated as being made in Fig. 4;

Fig. 6 is a front view of the face of the machine illustrated in Figure 1, showing the guard which is pivoted to the face in retracted position;

Fig. 7 is a rear view of the face and guard illustrated in Fig. 6;

Fig. 8 is a front view similar to that shown in Fig. 6, the guard being shown in operating position;

Figure 11:
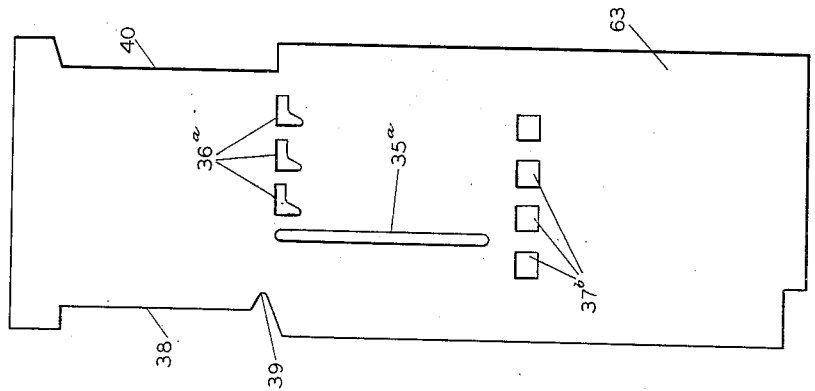
Figure 10:
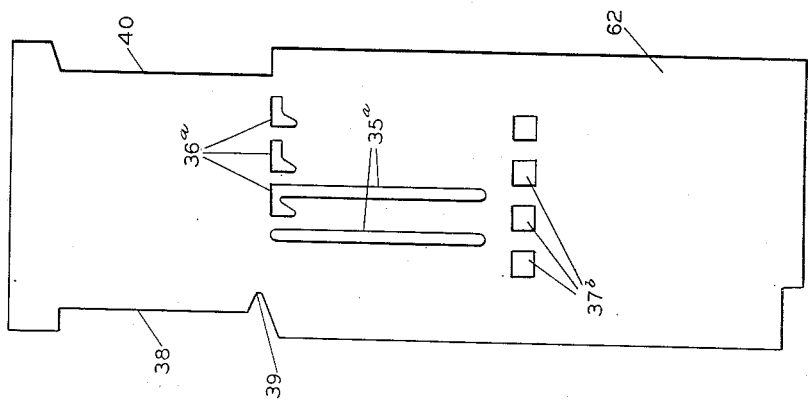
Figure 9:
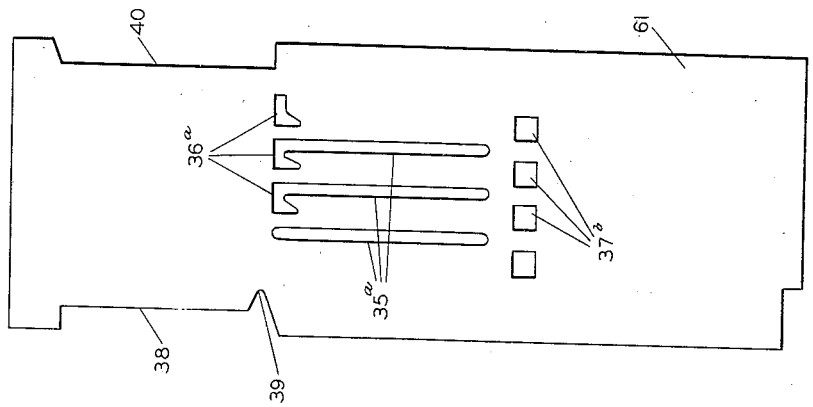
Figure 19:
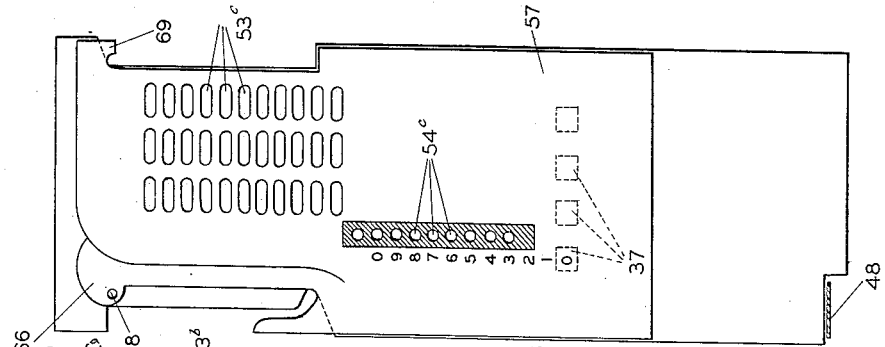
Figure 18:
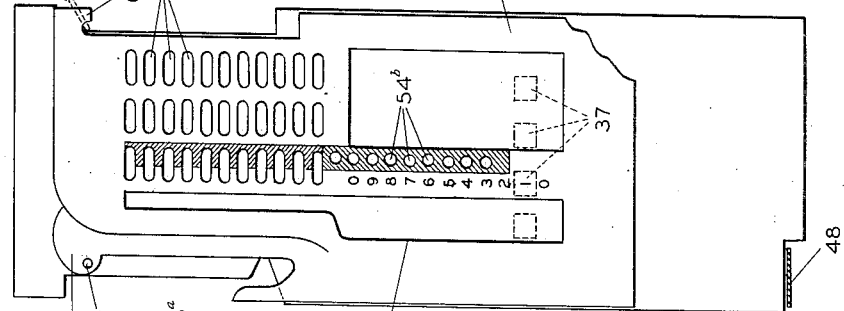
Figure 12:
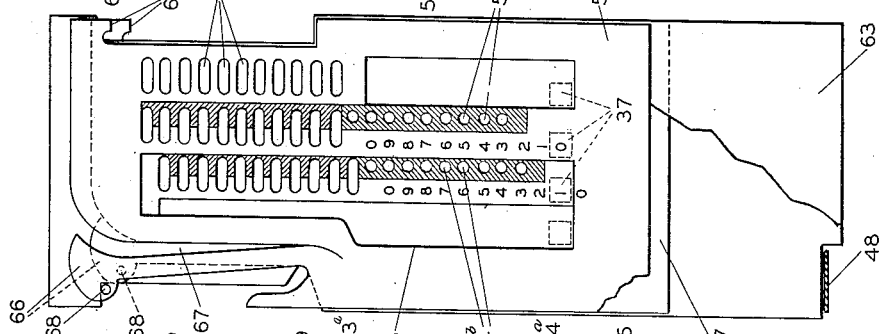
Figure 16:
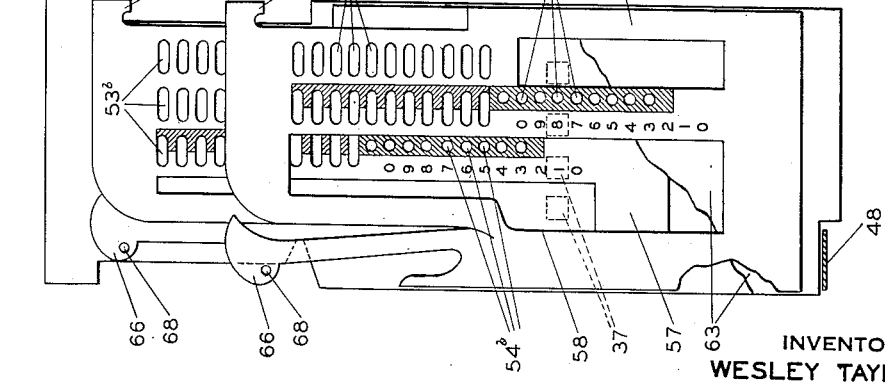

Figs. 9, 10, and 11 are front views of the slip sheets which lie between the indicator plates of the machine illustrated in Figure 1;

Figs. 12, 13, and 14 are front views of the machine, certain parts being removed and certain other parts being cut away, each of these views illustrating the parts in different relative position;

Figs. 15, 16, and 17 are front views similar to Figs. 12, 13, and 14, illustrating how the guard is retracted and how certain plates are altered in position without altering the reading of the totals in the machine;

Figs. 18 and 19 are front views, certain parts being removed and certain other parts being cut away, illustrating how the machine is cleared, or how the reading of the totals in the machine is brought back to zero;

Fig. 20 is a longitudinal cross section taken on the line XX—XX of Figure 1, the plates being in the positions illustrated in Fig. 2;

Fig. 21 is a similar section, the plates being in the positions illustrated in Fig. 3;

Fig. 22 is a similar section, the plates being in the positions illustrated in Fig. 5;

Fig. 23 is a transverse cross section on the line XXIII—XXIII of Figure 1;

Fig. 24 is a partial longitudinal cross section taken on the line XXIV—XXIV of Figure 1, with the indicator plates in arbitrary positions for the sake of clarity;

Fig. 25 is a front view of a different form of indicator plate from those illustrated in Figures 1 to 24;

Fig. 26 is a longitudinal cross section of the indicator plate illustrated in Fig. 25 taken on the line XXVI—XXVI, and Fig. 27 is an enlarged sectional view showing how two plates in the machine are engaged and moved simultaneously.

An important problem in designing a calculating machine is that of making the digits 0, 1, 2, 3, 4, 5, 6, 7, 8, 9, repeat themselves endlessly in a column in the order given, or in reverse order.

Another important problem is that of causing another selected column of digits, or a group of such columns, to move a required number of digit positions after an initial column of digits has moved a given number of digit positions.

I have found that the first of these problems may be solved very satisfactorily by the use of a series of plates, one plate for each column of digits,—as units, tens, hundreds, etc.—the plates lying substantially in parallel planes, and being oscillatory with respect to each other and with respect to a comparatively stationary member.

I have found further that the second of these problems may be solved by causing an actuating member to contact with one or more plates representing other columns of digits while still maintaining contact with the plate representing an initial column of digits when this last named plate has moved through a given number of digit positions. The actuating member then moves the plate representing the initial column of digits and the other plates with which it contacts through the proper distance.

In the drawings a four-column calculating machine is illustrated.

The operating parts of this machine are inclosed in a casing 30, which may be made of any known or suitable material. Positioned at or near the center of one of the larger sides of the casing 30 is an opening 31 of appreciable size through which certain parts within the casing may be seen. Also positioned in this side of the casing are a guard slot 32 and a clearing slot 33, the purpose of each of which will be subsequently described.

Immediately behind the side of the casing 30 in which the opening 31, the guard slot 32 and the clearing slot 33 are disposed, is a face 34. As here shown, the face 34 is co-extensive with the side of the casing 30 to which reference has just been made, and a part of the face is visible through the opening 31 in the casing 30, as will be evident from a glance at Figure 1. The face 34 has four columns of numerals thereon which may be seen through the opening 31 in the casing 30. The numerals in each column are in sequence: 1, 2, 3, 4, 5, 6, 7, 8, 9, inclusive, and when the machine is disposed facing the observer, in operating position, the numeral 9 is at the top of the column and the numeral 1 is at the bottom. Each numeral is spaced at an equal interval from the adjacent numeral or numerals in the column, this interval being hereafter referred to as the standard interval. The standard interval is the interval between digit positions in the machine.

The face 34 has an operating slot 35 therein adjacent each column of numerals and extending parallel thereto. The bottom of each slot extends the standard interval below the numeral 1 on the face. At the top of the operating slots 35 for all columns except the last one to the left are hooked extensions 36 of the slots, the purpose of which will later be apparent. The hooked extensions 36 project substantially two standard intervals beyond the digit position indicated by the numeral 9 on the face 34, and the cut out tip of the hook 36 is at the standard interval above the digit position of the numeral 9 and to the left of the slot 35.

At the ends of the columns of numerals in the face 34 and beyond the bottom of the operating slots 35 are four separate reading holes 37, one immediately below each column of numerals. The reading holes are within the area defined by the opening 31 in the casing 30.

The face 34 has a portion 38 thereof cut away behind the guard slot 32 in the casing in order that an actuating element projected through the guard slot in the casing may pass beyond the face. (See Figs. 6, 7, and 8.) A notch 39 is cut still more deeply into the face 34 at the base of this cut away portion 38.

A portion 40 is also cut away from the face 34, behind the clearing slot 33 in the casing, so that an actuating element projected through the clearing slot in the face may extend past the cut-away portion 40 in the face 34 without obstruction for the entire length of the clearing slot.

A guard 41 is attached to the face 34, for instance by being pivoted to it as by a pivot 42. As here shown, the guard lies on the opposite side of the face from that upon which the numerals are displayed. The guard 41 comprises a sheet of any desirable material and is especially constructed to close the operating slots 35 and to be withdrawn from them at certain times during the operation of the machine. Thus a series of fingers 43, 44, 45, 46 are formed on the guard 41. As the guard is turned in one direction about the pivot 42 these fingers will move across the operating slots 35 in the face 34 and close them, whereas turning the guard in the opposite direction about the pivot 42 will uncover the operating slots. In order that the reading holes 37 in the face shall not be closed by the guard attached thereto, an opening 47 is formed in the guard of such size, shape and position that the reading holes will remain at all times unobstructed.

A projection on the guard 41 provides means for turning the guard about the pivot 42 and thus closing the operating slots in the face when a force is applied to this projection. As here shown, this projection 48 is formed by turning substantially at right angles to the guard proper, from the short edge thereof adjacent the pivot, a portion of the sheet material of which the guard is made. Clearly, a force applied to this projection, acting in the direction of the arrow shown adjacent the projection 48 in Fig. 8 of the drawings, will turn the guard about the pivot 42, and thereby bring the fingers 43, 44, 45, 46 across the operating slots 35 in the face 34 as shown in Fig. 8.

Provision further is made for returning the guard to its original position with the operating slots uncovered, and as here shown a flat hook member 49 is formed unitary with the guard for this purpose. The hook member 49 extends to a point adjacent the cut away portion 38 of the face 34 and has an end 50 which will be projected into the cut away portion 38 when the fingers 43, 44, 45, 46 are moved to close the operating slots 35. The end 50 is so shaped as always to clear the notch 39 in the face 34, and a lower edge 51 on the end 50 extends at an angle to the guard slot 32 and in the general direction of the pivot 42. Thus an actuating element applied to the lower edge 51 of the end 50 at the notch and continuously moved in the guard slot 32 away from the body of the guard will turn the guard in a direction opposite to that which has been mentioned in connection with the projection 48. It will also slip beyond the end 50 and beyond any part of the guard in doing so. At the same time, the guard will be turned into a position with the fingers 43, 44, 45, and 46 uncovering the operating slots.

Clearly a separate face need not be used, but the slots therein may be formed in the casing itself, and the guard may be connected directly to the casing, or, indeed, to any convenient member.

Behind the face and the guard are a series of longitudinally slidable plates, each plate having elongated openings therein, and each plate having surfaces substantially perpendicular to the plane of the front of the plate (hereinafter referred to for simplicity as the "perpendicular surfaces of the plate"). As illustrated in Figs. 12 to 23 and 27, these perpendicular surfaces are formed by the plate material surrounding the openings therein, and are registrable with openings in other plates.

Thus the drawings show a plate 52 which is substantially as wide as the inside of the casing 30, but considerably shorter than the long dimension of the casing. They also show elongated openings 53 in the plate 52, and perpendicular surfaces of the plate having a different form, here illustrated as effected by circular openings 54 in the plate 52. Obviously, the openings 54 need not be circular in form; their shape as here shown is a mere matter of convenience in illustration and description.

The plate 52 is an indicator plate, slidable behind the face 34 and having a column of numerals thereon. The numerals on the plate 52 are similar to the numerals in any column on the face 34 in sequence and interval, except that a 0 is shown on the indicator plate at the standard interval above the 9 and also at the standard interval below the 1. When the 0 below the 1 appears in the units reading hole 37, the column of numerals on the units indicator plate is shifted two digit positions below the corresponding numerals on the face. This is illustrated by Figures 1 and 2, the latter figure being the same as the former with the casing and face removed. The reason for this is that the reading hole must be appropriately located in the face. The elongated openings 53 and the circular openings 54 are spaced longitudinally of the indicator plate having the standard interval between them. The elongated openings are laterally elongated. The circular openings on the plate 52 are spaced to take position adjacent the respective numerals in the units column on the face 34 when the 0 on the indicator plate shows through the reading hole 37 in the face.

Thus, if some form of actuating element or engaging means (for instance, a stylus 59) be projected through the operating slot 35 in the face, adjacent the units column of numerals, and if this means enter a circular opening 54, the indicator plate 52 can be made to slide longitudinally behind the face 34. Consider the machine as being in the position illustrated in Figure 1. If engaging means be projected into that circular opening 54 in the indicator plate 52 which is next the numeral 1 on the face 34, and if the engaging means be drawn down one digit position (that is to say until stopped by the bottom of the operating slot 35) the indicator plate will be slid one standard interval downward behind the face, and the 0 appearing in the units reading hole 37 will be replaced by a 1. If this operation be repeated, the indicator plate will be moved downward through one more standard interval, and the numeral 2 on the indicator plate will replace the numeral 1 in the reading hole.

Clearly, sliding the indicator plate up one standard interval, instead of down, will subtract 1 instead of adding 1.

Indicator plates 55, 56, and 57 are provided for the tens, hundreds, and thousands columns, respectively, a space 58 being cut away where necessary in each plate to give access to the plates behind for the engaging means. It is noted that the cut-away space 58 also provides an opening whereby numerals on the plates behind the plate 52 may be seen through the reading holes 37. The stylus 59 may therefore be projected into the circular openings 54a, 54b, 54c, etc. in the plates behind the plate 52 in order to slide them. Each indicator plate is therefore slid in accordance with the alteration to be made in the column which it represents, the total being at all times shown in the corresponding reading hole 37 in the face.

The perpendicular surfaces of the plates, which are registrable with the elongated openings, and by means of which the plates may be moved through the agency of an actuating member, may take different forms. For instance, they may be embodied in ridges 53' and 54' as illustrated in Figs. 25 and 26.

I prefer to employ means for separating the indicator plates at all times. With this in view, I insert a separator between the guard 41 and the first plate 52, and between each plate and the adjacent plate in the machine. The separators 60, 61, 62, 63 are preferably constructed of thin sheets of any suitable material, which may be the same material as that of which the plates are made. A set of such separators is shown in Figs. 9, 10, and 11. The separator 61 illustrated in Fig. 9 is the one which lies between the first plate 52 and second plate 55. The separator 62 illustrated in Fig. 10 is the one which lies between the second plate 55 and the third plate 56. The separator 63 illustrated in Fig. 11 is the one which lies between the third plate 56 and fourth plate 57. The separator 60 which lies between the guard 41 and the first plate 52 is shaped exactly like the face 34 (see Fig. 6) and is not illustrated. All of the separators may be made of the same size and general outline as the face, and will not slide appreciably within the casing because of their contact with its narrower sides and ends. The separators provide smooth surfaces over which the plates may slide, and they prevent undue friction between the plates or catching of one plate by another. The separators are provided with the necessary slots 35a and hooked extensions 36a (similar to those on the face) to permit passage of the operating means (illustrated as the stylus 59) through them where necessary to move the plate or plates behind them. They are also provided with reading holes 37b in register with the reading holes 37 in the face, in order that there may be a clear view from the reading holes 37 in the face to the numerals on the plate behind each separator.

In addition to preventing undue friction and catching between the plates, the separators perform another function. Each separator provides a stationary stop behind the circular openings 54 in the plate in front of it. Each separator also provides a stationary stop behind that part of the elongated openings 53 in the same plate which comes behind the operating slot 35 in the face when the plate has been slid downward. Thus a stylus 59, or other engaging means, projected through an operating slot 35 in the face 34 and into a circular opening or elongated opening of a plate behind that slot will come against the separator and cannot project farther into the machine. In contacting with the perpendicular surface formed by the opening, the stylus will move the plate while the depth of its projection into the machine is limited by the separator below.

The solution of the problem of causing the tens column to move one digit position when an addition in the units column exceeds 9 is illustrated in the drawings, and will now be described.

The machine is shown in Figure 1 as being cleared: that is to say, the numerals in the reading holes are 0, 0, 0, 0. The first number to be added is 7, and the stylus 59 is inserted in the circular opening 54 adjacent the numeral 7 in the units column on the face 34 (see Figure 1). The stylus is then pulled toward the operator to the bottom of the operating slot 35. Thereupon the numeral 7 appears in the units reading hole in the face. (See Fig. 3.) It is now desired to add 3, which will give a reading of 10. As the units column can show no integer higher than 9, a different operation is now required. The stylus is accordingly inserted in the opening (now an elongated opening 53) adjacent the numeral 3 in the units column on the face, and is moved upward to the hooked extension 36 of the operating slot 35 where it is moved to the left. (See Fig. 4.) When the stylus reaches the hooked extension 36 at the top of the operating slot 35 it passes through the hooked extension 36a in the separator 61 between the indicator plate 52 and the indicator plate 55 and engages an elongated opening 53 in the indicator plate 55 of the tens column (Fig. 4 and Fig. 22). The stylus is then pulled directly downward to the bottom of the hooked extension 36, moving the units and the tens indicator plates together through one standard interval. The units column then reads 0 in the reading hole and the tens column reads 1, showing a total of ten (see Fig. 5).

From the description just given it must be clear that a total of only 9 can be added in any column without moving the adjacent column to the left one digit position. It is also apparent that the second column is moved through one digit position by passing the actuating element upwardly to the hooked extension, there engaging the indicator plate representing the adjacent column to the left, and moving both plates together downwardly through one standard interval.

What actually happens is, of course, that the difference between 10 and the number to be added is subtracted from the first column and 1 is added in the next higher column. Thus in the example given where 3 is added to 7, the difference between 3 and 10 is subtracted from the units column (leaving 0) and 1 is added to the tens column, showing a total of 10 in the reading holes.

In order to indicate whether the actuating element is to be moved upwardly or downwardly in adding, some indicating means may be used, for instance two different colors may be used adjacent that position of the indicator plate which is seen through the operating slot. When 0 is seen in the reading hole for any column, one color (for instance yellow) appears opposite each numeral on the corresponding indicator plate. This indicates that the movement of the plate in adding is downward for any number from 1 to 9. Above the 9 another color (for instance green) appears on the plate, and when this other color is seen opposite a numeral on the face it indicates that addition of this numeral is performed by an upward movement ending in the hooked extension as explained above.

It is to be noted that when the stylus 59 passed through the hooked extension 36a at the top of the separator 61 and entered the elongated opening 53 in the second (or tens column) indicator plate 55, it might have passed on through the next separator 62, had something not stopped it. It was necessary that something stop the stylus before it passed through this next separator 62, for had it done so and moved the third (or hundreds column) indicator plate an incorrect total would have been obtained. Accordingly, means are employed, which is here shown as a leaf 64 attached to the side of the tens column indicator plate 55 which is farthest from the units plate 52, to close from behind certain elongated openings in the tens column plate and prevent passage of the engaging means or stylus 59 beyond these elongated openings. Because of the position of the leaf 64, however, it is possible for the stylus to engage the edge of the opening which the leaf closes from behind and to actuate the indicator plate. It will be observed that the leaf 64 leaves open the uppermost elongated opening of the plate 55. The reason for this will presently appear. Another construction for performing this function is illustrated in Figs. 25 and 26.

Figs. 12, 13 and 14 show how 1 is added to 99. First 90 is set up as the reading of the calculator by inserting the end of the stylus 59 into the opening opposite the numeral 9 in the tens column on the face 34, and pulling the tens column indicator plate 55 toward the operator until the stylus is stopped by the bottom of the operating slot. Next 9 is set up by performing the same operation in the units column. The reading of the machine is now 99. (See Fig. 12.) The second color, that is to say the color indicating that addition is performed by an upward movement, now appears in both columns opposite all numerals. Furthermore, the tens plate is now drawn down until the uppermost elongated opening, which is not closed by the leaf 64 but affords a complete opening through the plate, is behind the hooked extension 36 of the tens operating slot 35 in the face.

To add 1, the stylus is now inserted in the elongated opening adjacent the numeral 1 in the units column and moved upwardly into the hooked extension at the top of the units slot. Here its end passes through the hooked extension 36a in the separator 61, through the unrestricted top elongated opening in the tens indicator plate 55 behind the separator, through the hooked extension 36a in the separator 62 between the tens indicator plate 55 and the hundreds indicator plate 56, and into the elongated opening registering with these openings in the hundreds indicator plate 56. The stylus is prevented from penetrating further by the leaf 65 which is attached to the back of the hundreds column indicator plate 56. The stylus is now drawn toward the operator until it is stopped by the bottom of the cut-out tip of the hooked extension. In executing this last motion the stylus moves together all three plates (units, tens, and hundreds) downward through one standard interval, whereupon the hundreds column reads 1 and the tens and units columns each read 0. (See Fig. 13.)

The 0 which appears in the reading holes for the tens column is the 0 above the numeral 9 on the tens indicator plate. The 0 which appears in the reading hole for the units column, however, is the 0 below the numeral 1, for it will be remembered that the units indicator plate was moved upwardly as far as possible as a part of the last operation which was described. This means that the tens indicator plate is in its extreme lowermost position and that further additions cannot be made by simply shifting this plate, as heretofore described, from this position. At this point the operator must be advised that a certain operation must be performed before the next step in the calculation can be correctly made.

Upon attaining its extreme lowermost position the indicator plate 55 contacts with the projection 48 on the guard 41 and swings the guard about the pivot 42, thus closing the operating slots. (See Fig. 14.) Accordingly, the machine may not be used until the guard is moved back to its original position, and the operating slots are left open.

From the description given above, the reason for using the guard 41 must be apparent. The guard makes it necessary to perform certain operations before the calculating machine can be used further after the operating slots have been closed. Specifically, it is necessary to adjust the tens indicator plate from the position just described (that illustrated in Fig. 14) to one which will permit of its further functioning. I therefore provide means whereby in a simple movement of the stylus the guard may be retracted and the indicator plates may be moved in the machine until the 0 below the 1 on each plate will replace the 0 above the 9 in the reading holes. The steps of this operation are illustrated in Figs. 15, 16, and 17.

Each indicator plate has an adjuster tongue 66 thereon, which is here shown as lying on the left-hand side of the plate when the machine faces the operator. The adjuster tongue is merely a portion of the plate itself, which is separated for a considerable distance from the plate proper by a generally longitudinal cut 67. Normally, the adjuster tongue lies adjacent the plate proper, but because of the resiliency of the material of which the plate is formed, it may be separated from the plate by a force acting generally away from the plate. The resiliency of the material will cause the adjuster tongue to return to its position immediately adjacent the plate when this force is removed.

The adjuster tongue has an opening 68 near its upper end, this opening being located so that it will assume a position in the notch 39 of the face 34 when the plate of which it is a part has assumed its lowermost position, that is to say when the 0 above the numeral 9 shows through the reading hole in the face. Thus, in Fig. 14, the hole 68 in the adjuster tongue 66 on the tens indicator plate 55 lies near the apex of the notch 39. If the stylus 59 be inserted at the lower extremity of the guard slot 32 in the casing, and projected inwardly as far as it will go, it will therefore engage the hole 68 in indicator plate referred to. Moving the stylus along the guard slot 32 will pull the adjuster tongue away from the plate (see Fig. 15) and will then slide the plate upwardly in the casing, at the same time moving the guard back to its original position, as already described. (See Fig. 16). During this operation the other plates will not be affected because the adjuster tongue does not normally extend within the projection of the guard slot. When the stylus has reached the top of the guard slot, the 0 below the numeral 1 will be seen through the corresponding reading hole in the face. Withdrawing the stylus permits the adjuster tongue to spring back to its original position by virtue of the resiliency of the material. Thus the guard is removed, the tens indicator plate is returned to its normal position, and the machine is ready for further operation.

When it is desired to clear the machine—that is to say, when it is desired to replace all of the numerals appearing in the reading holes with zeros—the stylus is inserted at the bottom of the clearing slot 33, projected into the machine as far as it will go, and then moved to the upper end of the clearing slot. The stylus thereby engages the projections 69, which are formed in the form of projections 69, which are formed at the upper ends of the several indicator plates and which extend across the clearing slot 33. When the projection 69 has been moved to its extreme uppermost position, the indicator plate upon which that projection is formed is in such position that the 0 below the numeral 1 shows through the corresponding reading hole in the face.

In this embodiment, the stylus passes through an opening 53 or 54 in one plate, and its penetration is stopped by contact with the plate itself which lies behind the first-named plate. Ridges 53' or 54' on the second-named plate, behind the openings 53 and 54 in the first-named plate provide perpendicular surfaces or engaging means whereby the stylus may move the second plate with the first; and the elongated ridges 53' permit operations wherein the stylus is moved laterally in an elongated opening in the first-named plate. Although the plate formation is slightly different, a machine constructed with plates like that illustrated in Figs. 25 and 26 is operated exactly like the embodiment previously described.

It will be recognized that a machine constructed in accordance with my invention possessed certain outstanding and distinguishing characteristics. Only one moving part is required for each column of digits. At the same time there is no moving contacting means between one indicator plate and another: no indicator plate is moved by the movement of another, yet totals are carried from one column to a higher column or a plurality of higher columns by simultaneous motion of all of the plates which must be moved to give that total. Therefore, there is no accumulation of strain upon any indicator plate owing to the necessity of transmitting force to another plate, and consequently each plate need be merely large enough and strong enough to perform its own function.

The method of operation, therefore, comprises moving a plurality of indicator plates 52, 55, 56, and 57, lying substantially in parallel planes, and taking readings given by these indicator plates with respect to a substantially stationary member, here the face 34. As has been described, the indicator plates are moved at all times independently; in other words, the movement of any indicator plate is not dependent upon the movement of any other indicator plate, although the initiation of such movement may depend upon the position of an adjacent plate. The indicator plates may be moved at times simultaneously, as has been described in connection with the addition of 3 to 7 and the addition of 1 to 99. The motive force is applied independently and simultaneously to the series of indicator plates from a single source, which has been specifically described as a stylus 59.

The apparatus herein described and illustrated in the accompanying drawings is presented merely as an example of how the invention may be applied. Other embodiments which come within the proper scope of the invention will readily suggest themselves to those skilled in the art.

With this understanding, I claim:

1. In a calculating machine, a comparatively stationary member having parallel columns of digits thereon, and associated with said member a series of rectangular plates, one for each column of digits, said plates lying in substantially parallel planes, and said plates being oscillatory, in rectilinear direction only with respect to each other and with respect to said comparatively stationary member.

2. In a calculating machine, a casing, a plurality of parallel indicator plates of substantially the width of but of smaller length than said casing, said plates being adapted for rectilinear displacement longitudinally of said casing and relatively to each other, and numerals on each plate in sequence the numerals on one plate being displaced from those on the others in order that numerals on a plurality of plates may be read in sequence.

3. A calculating machine comprising a casing, a plurality of parallel indicator plates of substantially the width of but of smaller length than said casing, said plates being adapted for rectilinear displacement longitudinally of said casing and relatively to each other, numerals on each plate extending in columns longitudinally thereof in sequence, the column of numerals on each plate being displaced from those on the other plates, certain plates having a space therein cut away to permit the numerals on the plates behind them to be seen, and a face having reading holes therein through which numerals on successive plates may be read in sequence.

4. A calculating machine comprising a casing, a plurality of parallel indicator plates of substantially the width of but of smaller length than said casing, said plates being adapted for rectilinear displacement longitudinally of said casing and relatively to each other, not more than eleven numerals on each plate extending in columns longitudinally thereof in sequence, the column of numerals on each plate being displaced from those on the other plates, and a face having reading holes therein through which numerals on successive plates may be read in sequence.

5. In a calculating machine, a substantially rectangular plate having an opening therein, and a second substantially coextensive plate lying behind said first-named plate and in a plane parallel thereto, said second plate having formed thereon a surface substantially perpendicular to its major surfaces registrable with the opening in said first-named plate for simultaneous engagement of said plates by a plate-moving instrument.

6. In a calculating machine, a substantially rectangular plate having an opening therein, a second substantially coextensive plate lying behind said first-named plate and in a plane parallel thereto, said second plate having formed thereon a surface substantially perpendicular to its major surfaces registrable with the opening in said first-named plate for simultaneous engagement of said plates by a plate-moving instrument, and means for confining said plates by sliding contact with two parallel exterior edges of each plate, thereby preventing motion of said plates in one direction but permitting rectilinear motion back and forth in the perpendicular direction.

7. For use in a calculator, an indicator plate having a plurality of elongated openings therein through which an actuating member may project, said indicator plate also having a plurality of surfaces substantially perpendicular to the plane of its front, and a column of numerals thereon.

8. In a calculating machine, a rectangular plate having an opening therein, and a second rectangular plate lying in a plane substantially parallel to that of said first-named plate, said second plate having an opening therein registrable with the opening in said first-named plate, said plates each having thereon at the openings registering surfaces substantially perpendicular to their major surfaces for simultaneous engagement by a plate-moving instrument.

9. In a calculating machine, a face having an operating slot therein and reading holes beyond one end of the slot, a plate behind said face having openings therein in the projected area of the face slot upon said plate, a second plate having an opening therein registrable with the openings in said first-named plate, and numerals in series on each of said plates, the openings in said plates providing surfaces substantially perpendicular to the major surfaces of said plates for engagement by a plate-moving instrument of both plates when the openings are in register, and of said first plate when the openings are not in register.

10. In a calculating machine, a plate having openings therein, a second plate slidable with respect to said first-named plate, said second plate having an opening therein registrable with the openings in said first-named plate, the openings in said plates providing surfaces substantially perpendicular to the major surfaces of said plates for engagement by plate-moving means, and a leaf attached to the side of said second plate which is farthest from said first-named plate immediately behind certain openings in said second-named plate, said leaf serving to prevent passage of the means for engaging said plates beyond the openings behind which said leaf lies.

11. In a calculating machine, a plate having openings therein, a second plate slidable with respect to said first-named plate, said second plate having an opening therein registrable with the openings in said first-named plate, the openings in said plates providing surfaces substantially perpendicular to the major surfaces of said plates for engagement by plate-moving means, a separator between said plates, said separator having a portion thereof cut away to permit the openings in said plates to register, and a leaf attached to the side of said second plate which is farthest from said first-named plate immediately behind certain openings in said second plate, said leaf serving to prevent passage of the means for engaging said plates beyond the openings behind which said leaf lies.

12. In a calculating machine, a face having slots therein, a plate behind said face, said plate having formed thereon surfaces which are substantially perpendicular to the major surfaces of said plate in the projected areas of the face slots, a guard between said face and said plate, said guard having openings therein normally registrable with the face slots, and means on said guard coacting with said plate to slide said guard behind the slots in said face when said plate has attained a predetermined position.

13. In a calculating machine, a face having slots therein, a plate behind said face, said plate having formed thereon surfaces which are substantially perpendicular to the major surfaces of said plate in the projected areas of the face slots, a pivoted guard between said face and said plate, said guard having openings therein normally registrable with the face slots, and means on said guard coacting with an end of said plate to slide said guard behind the slots in said face when said plate has attained its extreme position in the direction of the end with which said guard means coacts.

14. In a calculating machine, a face having a slot therein, a plate behind said face, said plate having formed thereon a surface which is substantially perpendicular to the major surfaces of said plate in the projected area of the face slot, a guard pivoted to said face between said face and said plate, said guard having an opening therein normally registrable with the face slot, and means on said guard coacting with an end of said plate to slide said guard behind the slot in said face when said plate has attained its extreme position in the direction of the end with which said guard means coacts, and a projection on said guard for returning said guard to its original position.

15. In a calculating machine, a face having a guard slot and a clearing slot therein, said face also having operating slots and reading holes therein, columns of numerals on said face adjacent the respective operating slots therein, and a pivoted guard behind said face, said guard having fingers thereon for closing the operating slots in said face, in combination with a plurality of indicator plates behind said face slidable with respect to said face and with respect to each other, certain of said indicator plates having openings therein registrable with openings in other plates, all of said plates having formed thereon surfaces which are substantially perpendicular to the major surfaces of said plates whereby said plates may be moved, a column of numerals on each indicator plate, the numerals in each column being disposed to be visible successively through a reading hole in said face, a separator between each pair of indicator plates, an adjuster tongue on each indicator plate behind a portion of the guard slot in said face, and a projection on each indicator plate extending behind the clearing slot in said face in certain positions of said indicator plate, substantially as described.

WESLEY TAYLOR.